US011734065B2

(12) United States Patent
Koneru (10) Patent No.: US 11,734,065 B2
(45) Date of Patent: *Aug. 22, 2023

(54) CONFIGURABLE SCHEDULER WITH PRE-FETCH AND INVALIDATE THREADS IN A GRAPH STREAM PROCESSING SYSTEM

(71) Applicant: Blaize, Inc., El Dorado Hills, CA (US)

(72) Inventor: Satyaki Koneru, Folsom, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/976,817

(22) Filed: Oct. 30, 2022

(65) Prior Publication Data

US 2023/0051505 A1 Feb. 16, 2023

Related U.S. Application Data

(63) Continuation of application No. 17/091,055, filed on Nov. 6, 2020, now Pat. No. 11,513,845.

(51) Int. Cl.
*G06F 9/48* (2006.01)
(52) U.S. Cl.
CPC .................................. *G06F 9/4881* (2013.01)
(58) Field of Classification Search
CPC .................................................... G06F 9/4881
See application file for complete search history.

(56) References Cited

U.S. PATENT DOCUMENTS

| | | | |
|---|---|---|---|
| 7,140,019 B2 | 11/2006 | May et al. | |
| 7,856,544 B2 | 12/2010 | Schenfeld et al. | |
| 8,291,006 B2 | 10/2012 | Andrade et al. | |
| 9,367,658 B2 | 6/2016 | Pell et al. | |
| 2011/0289507 A1 | 11/2011 | Khan et al. | |
| 2013/0036409 A1 | 2/2013 | Auerbach et al. | |
| 2014/0130023 A1 | 5/2014 | Chen et al. | |
| 2014/0176588 A1 | 6/2014 | Dulak, Jr. et al. | |
| 2014/0181477 A1 | 6/2014 | Vaidya et al. | |
| 2018/0307487 A1 | 10/2018 | Maiyuran et al. | |
| 2019/0188038 A1* | 6/2019 | Puppala | G06F 9/3851 |
| 2019/0235917 A1 | 8/2019 | Koneru et al. | |

* cited by examiner

*Primary Examiner* — Wissam Rashid
(74) *Attorney, Agent, or Firm* — Brian R. Short (57) ABSTRACT

Systems, apparatuses, and methods are disclosed for scheduling threads comprising of code blocks in a graph streaming processor (GSP) system. One system includes a scheduler for scheduling plurality of prefetch threads, main threads, invalidate threads. The plurality of prefetch threads includes prefetching data from main memory required for execution of the main threads of the next stage. The plurality of main threads includes a set of instructions operating on the graph streaming processors of GSP system. The plurality of the invalidate threads includes invalidating data location/s consumed by the plurality of the main threads of the previous stage. A portion of the scheduler is implemented in hardware.

20 Claims, 8 Drawing Sheets

Complex Dependent Graph 500

CONFIGURABLE SCHEDULER WITH PRE-FETCH AND INVALIDATE THREADS IN A GRAPH STREAM PROCESSING SYSTEM

RELATED PATENT APPLICATION

This patent application in a continuation of U.S. patent application Ser. No. 17/091,055, filed Nov. 6, 2020, which is herein incorporated by reference.

FIELD OF EMBODIMENTS

The described embodiments relate generally to graph stream processing systems. More particularly, the described embodiments relate to systems and methods for scheduling of code for execution in graph stream processing systems.

BACKGROUND

The onset of computation heavy applications is causing a paradigm shift from centralized computing to parallel and distributed computing. Parallel computing includes distributing computing jobs to the various computing resources. These resources generally include several central processing units (CPU), memory, storage, and support for networking.

Centralized computing works well in many applications but falls short in the execution of computation rich applications, which are increasingly popular. Programs can be executed in a serial fashion or distributed to be executed on multiple processors. When programs are executed in a serial fashion, only one processor can be utilized and hence the throughput is limited to the speed of the processor. Such systems with one processor are adequate for many applications but not for compute intensive applications. Code can be executed in parallel in graph stream processing systems leading to higher throughput. Graph stream processing systems entail breaking of code into smaller code blocks and efficiently managing the execution of code. In order for the processors to execute in parallel, data to each of the processors has to be independent. Instances of a same code block can be executed on several processors simultaneously to improve the throughput.

If the processors need data from a previous execution, then parallel processing efficiency could decrease. Data dependency needs to be considered when scheduling processors. Efficiently managing multiple processors and data dependency for higher throughput is challenging. It is desirable to have a method and system for fast and efficient management of data buffers in computation rich applications.

DETAILED DESCRIPTION

Figure 1:
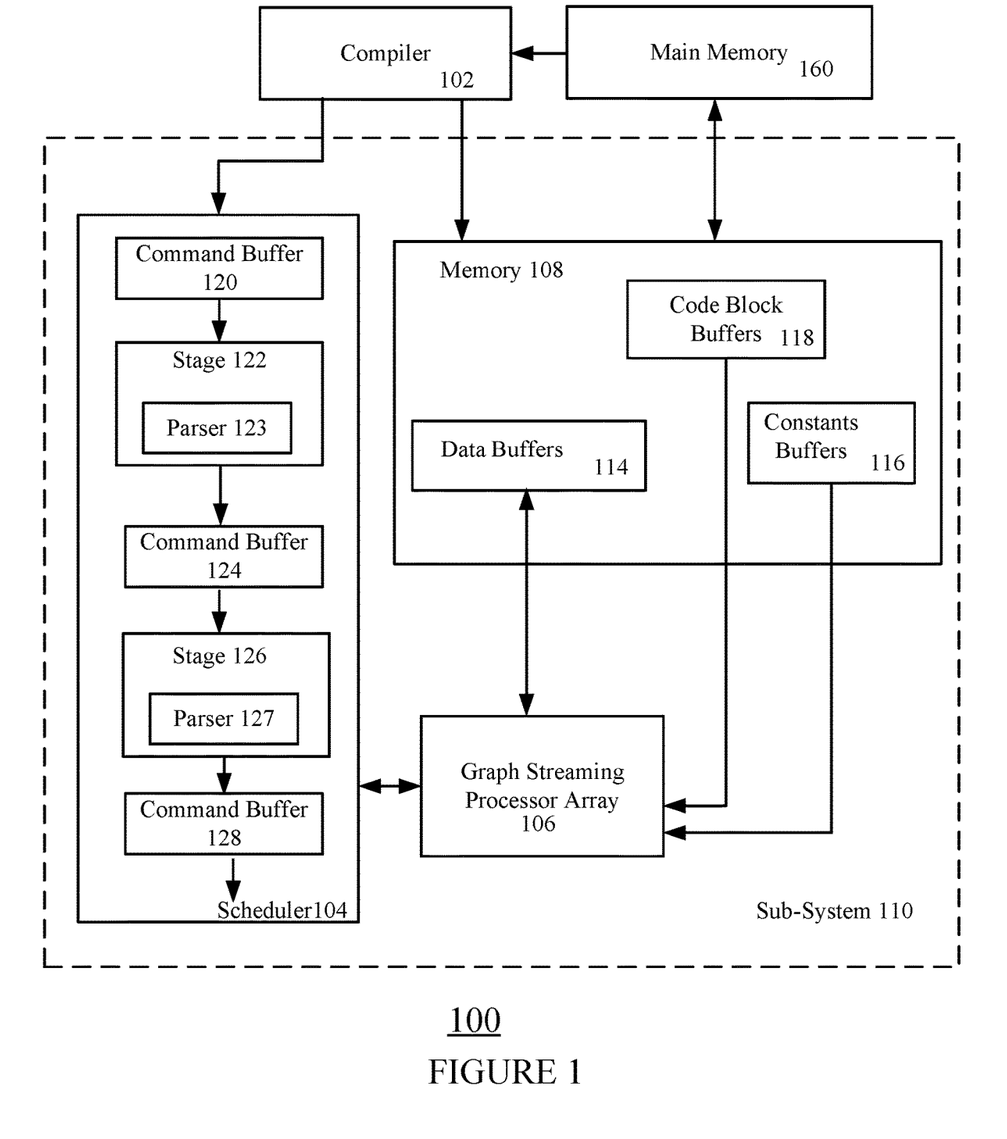
FIG. 1 shows a block diagram of an embodiment of a system of graph streaming processor.

FIG. 1 is a schematic diagram illustrating implementations of certain features associated with an example of a system of scheduling threads for execution across multiple processors operating in a graph streaming processor system 100.

In an embodiment, system 100 comprises of compiler 102, main memory 160 and sub-system 110. In a non-limiting embodiment, sub-system 110 includes scheduler 104, graph streaming processor array (GSP) 106, main memory 160 and memory 108.

Compiler 102 reads program code stored in main memory 160 and segments program code into code blocks to enable/optimize task parallelism of the processing. Main memory 160 is generally a slower access large memory. For the described embodiments, block or code blocks refer to a section or portions of code grouped together. Grouping enables groups of statements to be treated as if they were one statement, and to restrict the scope of variables, procedures and functions declared in a block so that they do not conflict with variables having the same name used elsewhere in a program for different purposes. Flow constructs such as if and for loops cannot straddle code blocks. Each of these code-blocks is a set of instructions along with its inputs and outputs. The thread is a code-block which is scheduled for operation on the graph streaming processor (GSP) array 106. Each thread is a physical instance of a set of instructions (kernel/program/code-block) running on a set of data and producing output data. A kernel/program can be a code block of a larger program. For an embodiment, the compiler program splits up the program into code-blocks at points where the vectorness/width of the code changes to enable/optimize task parallelism. The vectorness/width indicates the degree of parallel processing.

For an embodiment, the scheduler 104 includes a plurality of stages 122, 126, wherein each of the stages (122, 126) include an interface to an input command buffer (120, 124) and input command buffer parser (123, 127) of the stages (122, 126). Each stage (122, 126) of the graph streaming processor system includes a physical piece of hardware in the scheduler which is responsible for scheduling the threads. The input command buffer parser 123, 127 generates the threads of the stage 122, 126 based upon commands of a command buffer 120, 124 located between the current stage and the previous stage. The command buffers have command written into them that provides parallel processing and trigger threads for later occurring stages.

The plurality of threads run on the graph streaming processor (GSP) array 106. For an embodiment, scheduling of a thread on the processors is based on availability of resources including a thread slot in a GSP 106, adequate space in the register file in the GSP and in the output command buffer for writing the commands produced by the executing instructions in the GSP.

For an embodiment, the threads running on the processors have instructions embedded by the compiler to spawn/create downstream threads. The execution of these instructions results in commands which are placed in the output command buffer of the stage which in turn becomes the input command buffer for the next (later) stage.

For an embodiment, the locations of the command buffers between the stages and the hardware implementation of the stages allows for substantial performance advantages over software implementations of the command buffers and schedulers (stages).

For an embodiment, a node is a code-block along with the inputs, outputs. A node can be split up into one or more threads with each thread running the same code-block but on different data and producing different data. More than one node can be included within a stage. A graph can provide a visual dependency relationship between the nodes. For an embodiment, a stage is a physical piece of hardware in the scheduler which is responsible for scheduling the threads corresponding to the node/s at a particular depth (relative timing of the nodes) in the graph. The stage includes an input command buffer parser. The node generates threads based on the commands in the command buffer.

Scheduler 104, schedules execution of the code blocks in one or more processors of the graph streaming processor array (GSP) 106. Scheduler 104 is coupled to the compiler, graph streaming processor array 106 and memory 108. For an embodiment, the scheduler 104 includes a plurality of stages and a plurality of command buffers located between each of the plurality of stages, wherein each stage includes physical hardware operative to schedule each of the threads, including an input command buffer parser operative to interpret commands within a corresponding input command buffer and generate the plurality of threads. In an embodiment a portion of scheduler 104 is implemented in hardware.

In a non-limiting example, memory 108 comprises a plurality of data buffers 114, command buffers 120, constants buffers 116 and code block buffers 118. Input command buffers 120, 124 store the index pointing to the data buffers 114. Index to the first input command buffer (120) connected to the compiler is provided by the compiler, subsequent indices are written by the graph streaming processor array. Stage 122 reads the command buffers 120 and schedules a thread in the graph streaming processor array 106 to execute instructions. The index to the data for execution of code by the processor array 106 is stored in command buffers 12. In some embodiments, command buffers 120 and 124 can also store pointer to code block buffers 118. Memory 108 may represent any suitable or desired information storage medium. Memory 108 may be coupled with processing array 106.

Data buffers 114, comprises of a plurality of buffers to store data for processing or for storing the results of processing. Data buffers 114 communicate with the graph streaming processor array 106. The index to the data buffer 114 is stored in the command buffer 120, 124. Code block buffer 118 stores the code blocks for execution by the processor array 106. In an embodiment, data buffers and command buffers are First in First out (FIFO) buffers, DRAM, MRAM or SRAM. Compiler 102 partitions the code and writes the code blocks in the code block buffer 118. The code block buffer 118 is read by the processor array 106 for execution. Compiler 102 stores constants required for code blocks in constants buffers 116. Processor array 106 reads the constants buffer 116 when required for execution of the code block. In some embodiments, constants buffer 116 is written by compiler 102 and read by GSP array 106.

Figure 2:
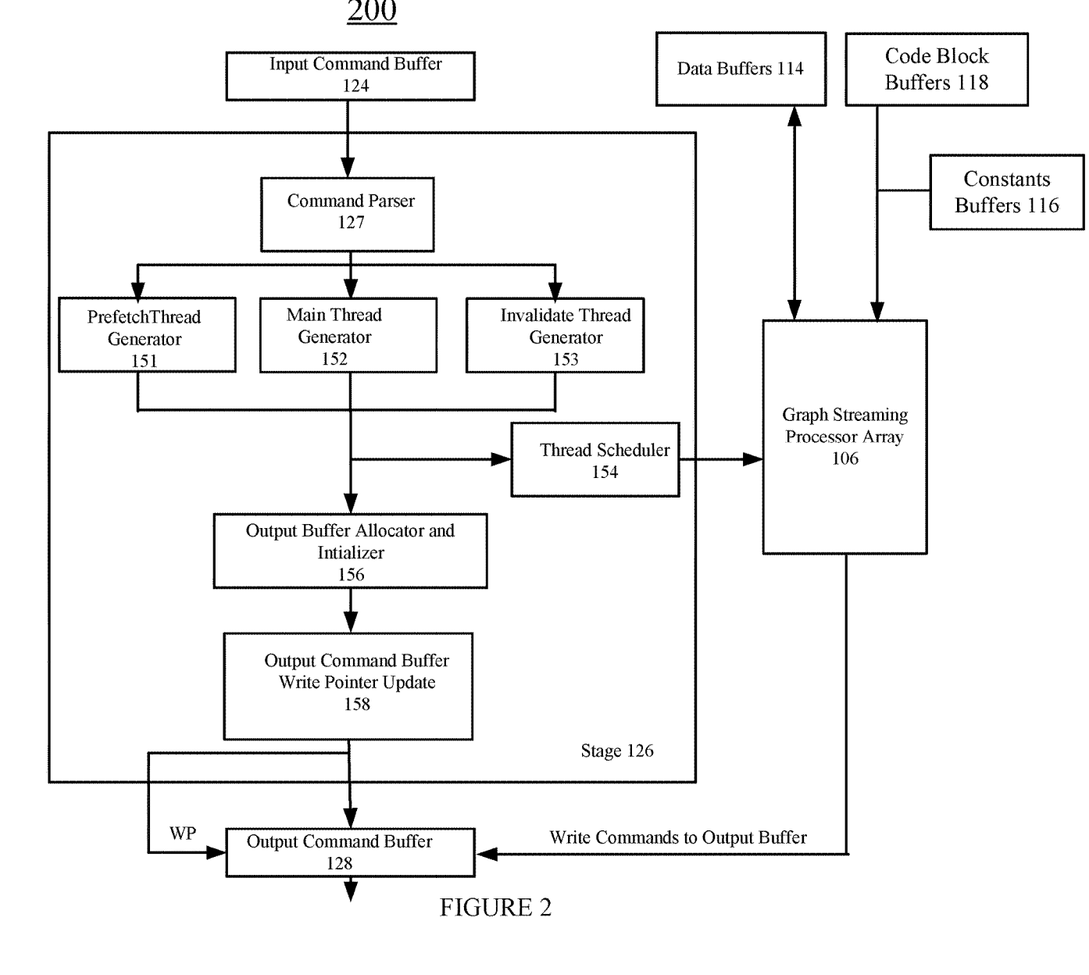
FIG. 2 shows a block diagram of an embodiment of a stage with prefetch thread generator, main thread generator and invalidate thread generator in a system of graph streaming processor.

200 in FIG. 2 shows a stage of a graph streaming processor system. As mentioned earlier, in some embodiments, stage 126 is implemented in hardware to improve the efficiency of the system. Stage 126 is coupled to input command buffer 124 and output command buffer 128. Command parser 127 receives code blocks from command buffer 124 and parses the code. Input command buffer 124 stores instructions for execution of stage.

Prefetch thread generator 151 receives the parsed code from command parser 127 and generates prefetch threads. Prefetch threads as the name suggests are threads to prefetch data from memory 108 and store in on-chip memory 108. Prefetched data from memory is stored in on-chip memory such as DRAM. Prefetching data enables availability of data in on-chip memory. Fast accesses times of on-chip memory reduces the idle time of the graph streaming processors. Prefetching data improves the efficiency of the system as the processing array can be operational most of the time. In this disclosure, prefetch data refers to data from data buffers 114, instruction from code block buffers 118 and constants from constants buffers 116 required for execution for a stage.

Thread scheduler 154 schedules the prefetch threads for fetching data from memory. Prefetching data is completed before executing at least one main thread of a stage. Prefetched threads are executed in the same stage or in a later stage of the main threads. Main thread generator 152 receives the parsed code from command parser 127 and generates main threads for execution.

Once all threads of a stage are executed, data required for that stage is not required. Freeing up memory locations that stored data for a previous stage enables storage of new data. Freeing up memory locations is performed by invalidating unwanted memory locations. Invalidation is performed after all threads of a stage are executed. Invalidate thread generator 153 generates threads for invalidation of memory location of a particular stage or a previous stage. In an embodiment, invalidation includes clearing the memory.

Thread scheduler 154 schedules the generated prefetch threads for prefetching data from memory and storing on-chip memory in 108, main threads for execution in the plurality of processors in the graph streaming processor array 106, and invalidate threads for invalidating locations in on-chip memory 108. For at least some embodiments, a thread scheduler 154 is responsible for scheduling and management of all the threads and tasks running in an execution core of the graph stream processing system.

Output buffer allocator and initializer 156 allocates memory space in the output command buffer for processing the thread. The output buffer allocator and initializer first clears the allocated memory by writing dummy entries before GSP 106 can write new data. In an embodiment, dummy entries could be all '1's or all '0's or any other combination. Output command buffer write pointer update updates the write pointer when an output command is written into the output command buffer 128. The write pointer after the completion of the dummy entry writes becomes the future completion pointer for the next stage. The completion pointer is updated after thread completion but in an in-order fashion i.e. the completion pointer updates sequentially in the same temporal order as the dispatch. In one embodiment, instructions executed by GSP 106 triggers writing the commands to output command buffer 128.

Figure 3:
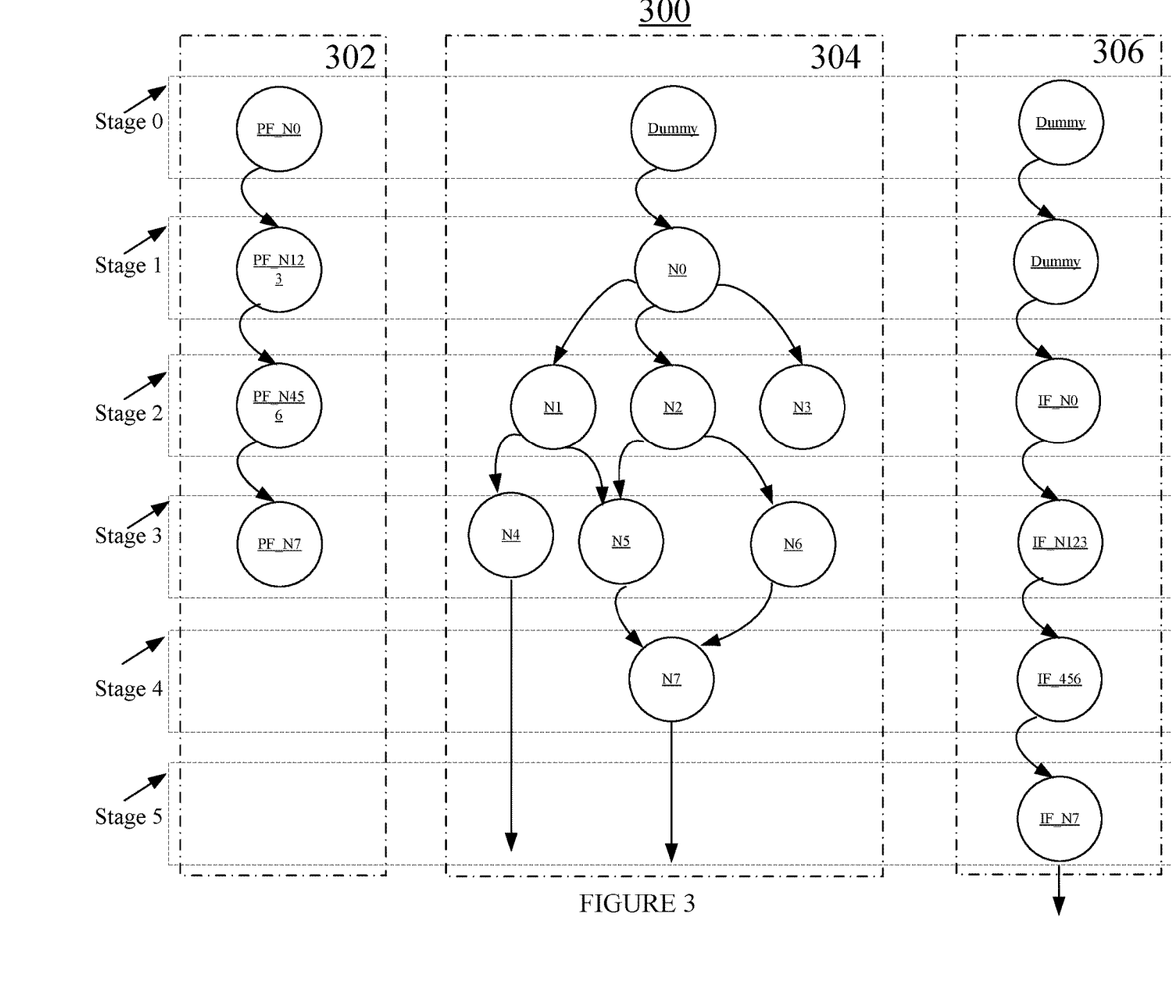
FIG. 3 shows a graph of prefetch, main and invalidate threads, according to an embodiment.

FIG. 3 is an example graph 300 of prefetch thread graph 302, main thread graph 304 and invalidate thread graph 306 in different stages. The GSP architecture is designed for execution of an acyclic data flow graph in streaming fashion. The graph is made up of connected nodes where the arcs between the nodes of the graph indicates the dependency between them. PF_N0 is the prefetch node 0 of Stage 0, PF_N123 is the prefetch nodes of Stage 1. Similarly, N0 is the main node of Stage 1, Stage 1. N1, N2 and N3 are nodes of Stage 2. IF_N0 is the invalidate node of Stage 2, IF_N123 is the invalidate node of Stage 3.

In an embodiment, prefetch thread generator 151 generates thread of node N0, (PF_N0) to prefetch data required for execution of Stage 1 of the main thread from main memory 160 and store in on-chip memory 108. The thread scheduler 154 schedules the prefetch thread/s for the operation.

Once all data required for execution of Stage 1 are prefetched, thread scheduler 154 schedules the next prefetch threads of node PF_N123 of Stage 1 generated by the prefetch thread generator 151. In the example prefetch threads of Stage 1 which might include prefetch data for more execution of Nodes N1, N2 and N3. After prefetching data required for execution of Stage 1, prefetch of data for Stage 2 is scheduled by the thread scheduler 154. Similarly, all data required for the next stage are prefetched until the last stage i.e. Stage3 and node PF_N7 schedules the last prefetch thread.

The main threads trail the prefetch threads by at least a depth (explained later) of one. Once all data required for execution of the main thread of Stage 1 are prefetched, thread scheduler 154 schedules the main thread of Node N0 of Stage 1 for execution in the graph streaming processor array 106. All data required for execution of Stage 1 was prefetched in Stage 0 and stored in on-chip memory 108, the system does not have to wait for data fetch from slower access memory 160.

After execution of at least one thread of Stage 1, the thread scheduler 154 schedules the main threads of Stage 2 of Nodes N1, N2 and N3 if all data for Stage 2 has been prefetched by prefetch thread PF_N123. After execution of at least one thread of Stage 2, the thread scheduler 154 schedules the main threads of Stage 3 of nodes N4, N5 and N6. In this embodiment node N5 is dependent on nodes N1 and N2, at least one threads from each of the nodes N1 and N2 need to be completed before executing threads of node N5. Similarly, after execution of at least one thread of Stage 3, the thread scheduler 154 schedules the main threads for Stage 4 of Node 7 for execution.

The invalidate threads trail the main threads by at least a depth (explained later) of one. After the execution of all main threads of node N0 of Stage 1, invalidate thread of node IF_N0 of Stage 2 is scheduled for operation by the thread scheduler 154. Operation of the invalidate thread as explained earlier includes invalidating all on-chip memory locations used by threads of node N0.

After execution of all main threads of all nodes of Stage 3 (N4, N5 and N6), invalidate thread of Stage 4 of node IF_456 is scheduled to operate. Similarly, the last invalidate thread (IF_N7) is scheduled for operation after all main threads of node N7 are executed.

Figure 4A:
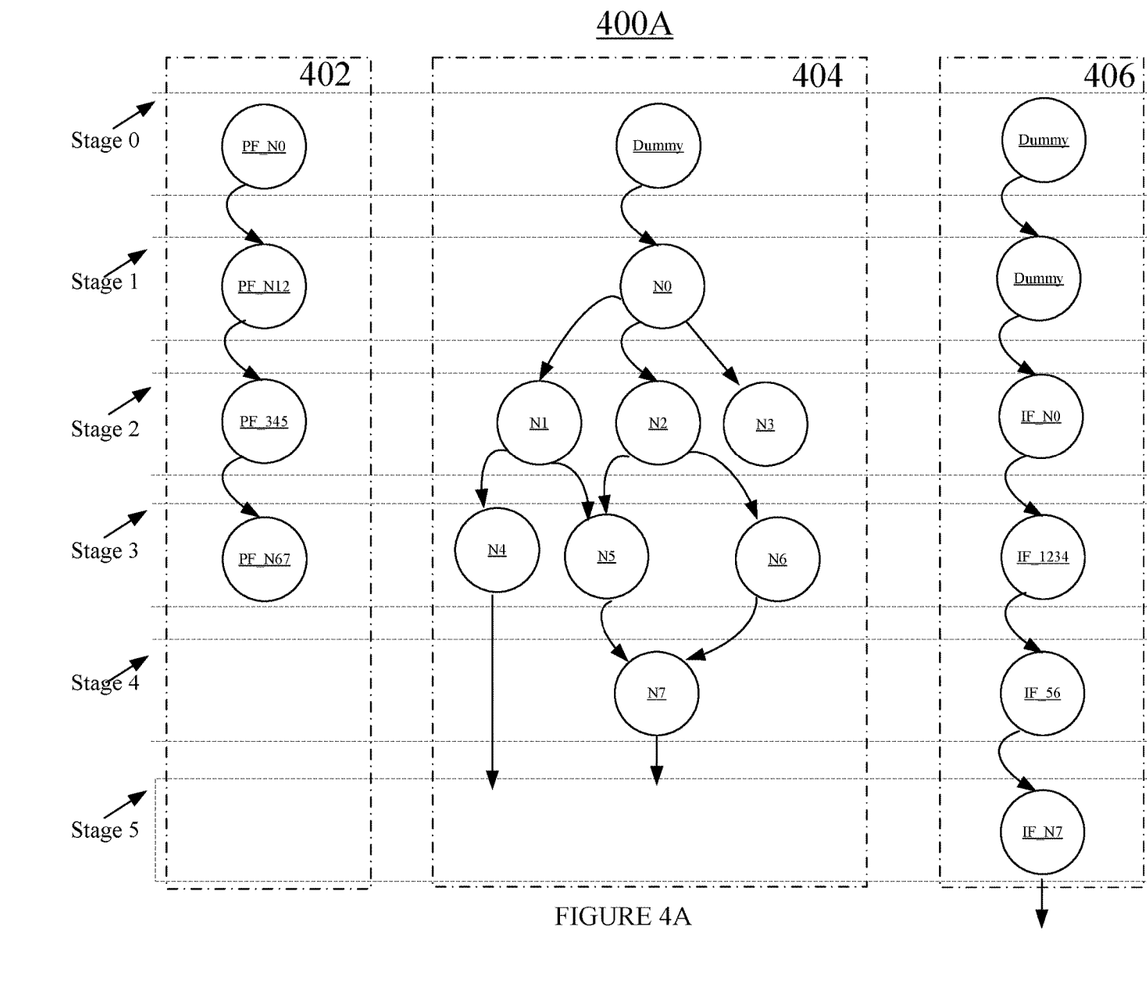
FIG. 4A shows a graph of prefetch, main and invalidate threads according to another embodiment.

FIG. 4A is an example graph 400A of prefetch thread graph 402, main thread graph 404 and invalidate thread graph 406 in different stages. Example 400A is very similar to 300 except for prefetch of data execution of threads and execution of main threads or execution of main threads and invalidation of data can operate in a stage.

In a non-limiting example, prefetch of data and execution of main threads can operate in the same stage. Data prefetch of threads of node N3 and execution of main threads of node N3 operate in the same stage. In another example, execution of main threads and invalidation of threads operate in the same stage. Execution of main threads of node N4 and invalidation of threads of N4 can operate in Stage 4.

Figure 4B:
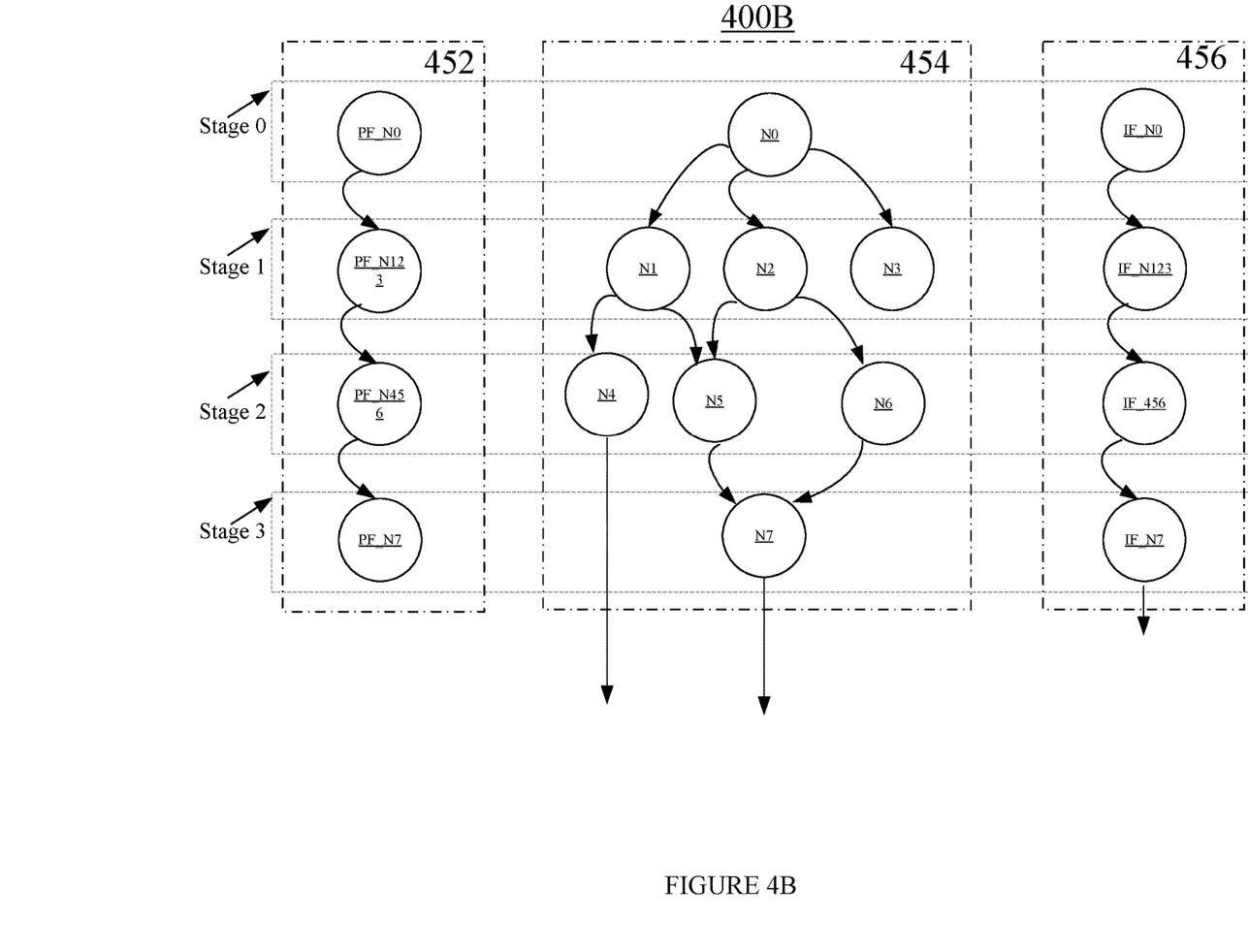
FIG. 4B shows a graph of prefetch, main and invalidate threads according to another embodiment.

FIG. 4B is an example graph 400B of prefetch thread graph 452, main thread graph 454 and invalidate thread graph 456 in different stages. Example 400B is very similar to 300 except for prefetch of data execution of threads, execution of main threads and invalidation of data can operate in a stage.

In a non-limiting example, data prefetch of threads of node N0, execution of main threads of node N0 and invalidation of data in the on-chip memory for threads of N0 can operate in Stage 0. Similarly, prefetch of data required for execution of main thread of node N6, execution of main threads of node N6 and invalidation of data required for execution of node N6 are all executed in Stage 2.

Figure 5:
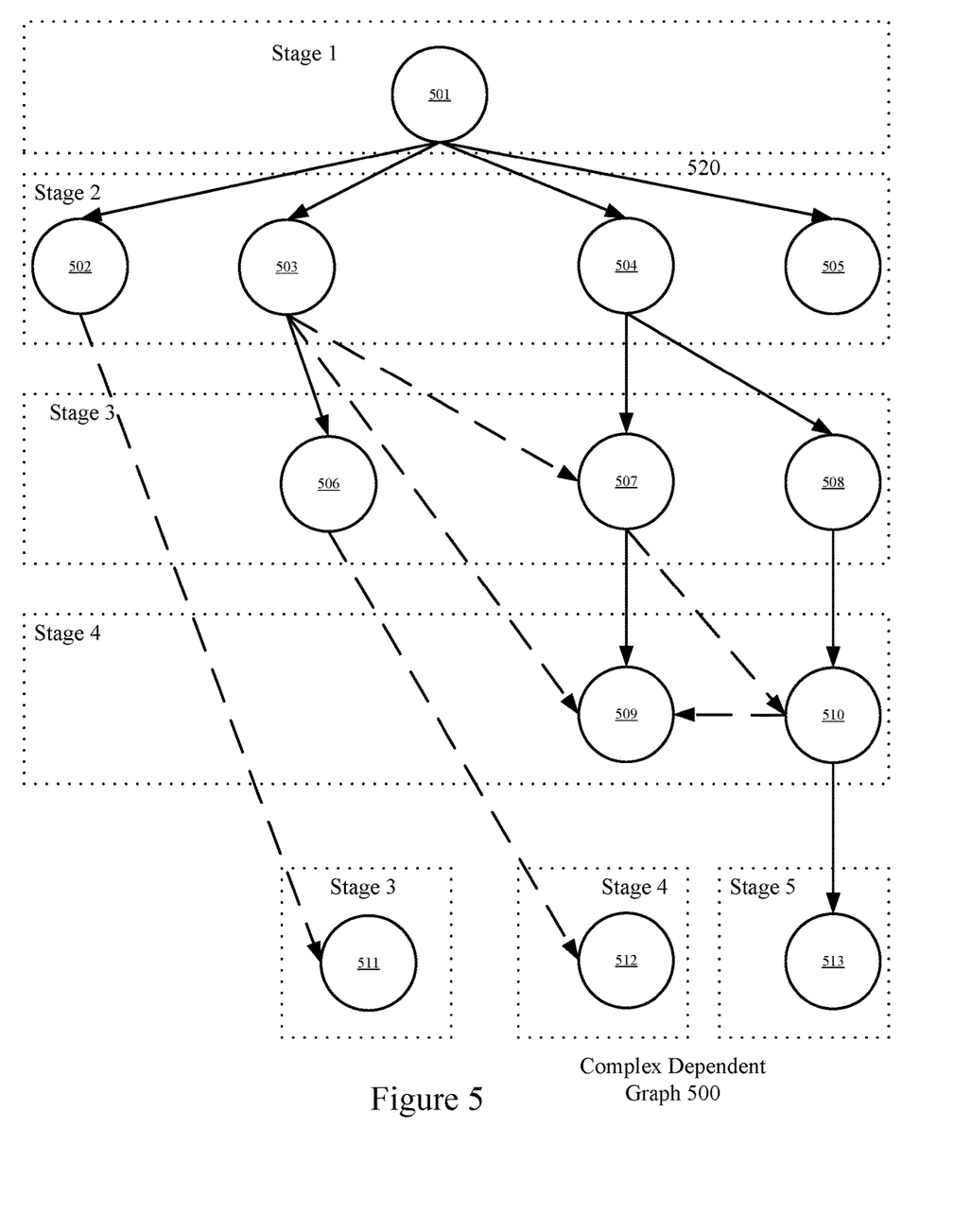
FIG. 5 shows a complex dependent graph, according to an embodiment.

FIG. 5 shows a complex dependent graph 500, according to an embodiment. For an embodiment, nodes 501-513 represent a part or portion of application processing isolated into a kernel. For an embodiment, a node or task includes a code-block along with the inputs and outputs. For an embodiment, a node includes one or more threads with each thread running the same code-block but on different data and producing different output data.

Each of the nodes 501-513 may be processed in parallel with multiple threads, wherein each thread may or may not be dependent on the processing of one or more other threads. As shown in the complex dependent graph 500, the nodes 501-513 are connected through arcs (for example, arc 520) which reflect the dependencies between the nodes 501-513. A thread may be dependent on data generated by other threads of the same node, and/or data generated by threads of other nodes. For an embodiment, each node is processed at a depth, which can be represented by an acyclic graph. For an acyclic graph as represented by the complex dependent graph 500, a node is dependent only on nodes at a lower (that is, dispatched earlier in time from a previous stage) or same depth (dispatched earlier in time but from the same stage)

In an embodiment, the topology comprises of nodes, data buffers, command buffers and constants buffers. Data buffers store data while command buffers store an index to the data buffer. In an embodiment, each node receives data from a data buffer and writes the results of the execution in another data buffer. Thus, data buffers are connected at the input and output of each node. In an embodiment, multiple data buffers can exist between nodes. In another embodiment, a data buffer can provide data to more than one node. A node can write to more than one output data buffer. Each node can read from one or more data buffers. In an embodiment, one command buffer exists at the output of each stage. In the described embodiments, stage refers to the depth of a node in the topology. For example, top node 501 has a depth of 0 or stage 1, nodes 502, 503, 504 and 505 have a depth of 1 or stage 2. Similarly, nodes 511, 506, 507 and 508 have depth 2 or stage 3, nodes 509, 510 and 512 have depth 3 or stage 4, node 513 is of depth 4 and stage 5. Each of the nodes of the same depth has the same stage. In an embodiment, threads of different stages can be executing at the same time in GSP 106.

In some embodiments, a command buffer can store index to more than one data buffer when a node is connected to more than one node at the output. In other embodiments, a command buffer can store index to more than one data buffer connected to a single node or multiple nodes.

In an embodiment, in every node a special instruction is embedded in the code block. The special instruction indicates to the scheduler to schedule the next thread for execution. The instruction also updates the output command buffer. In an embodiment, updating command buffer triggers scheduler 104 to schedule the next thread.

Figure 6:
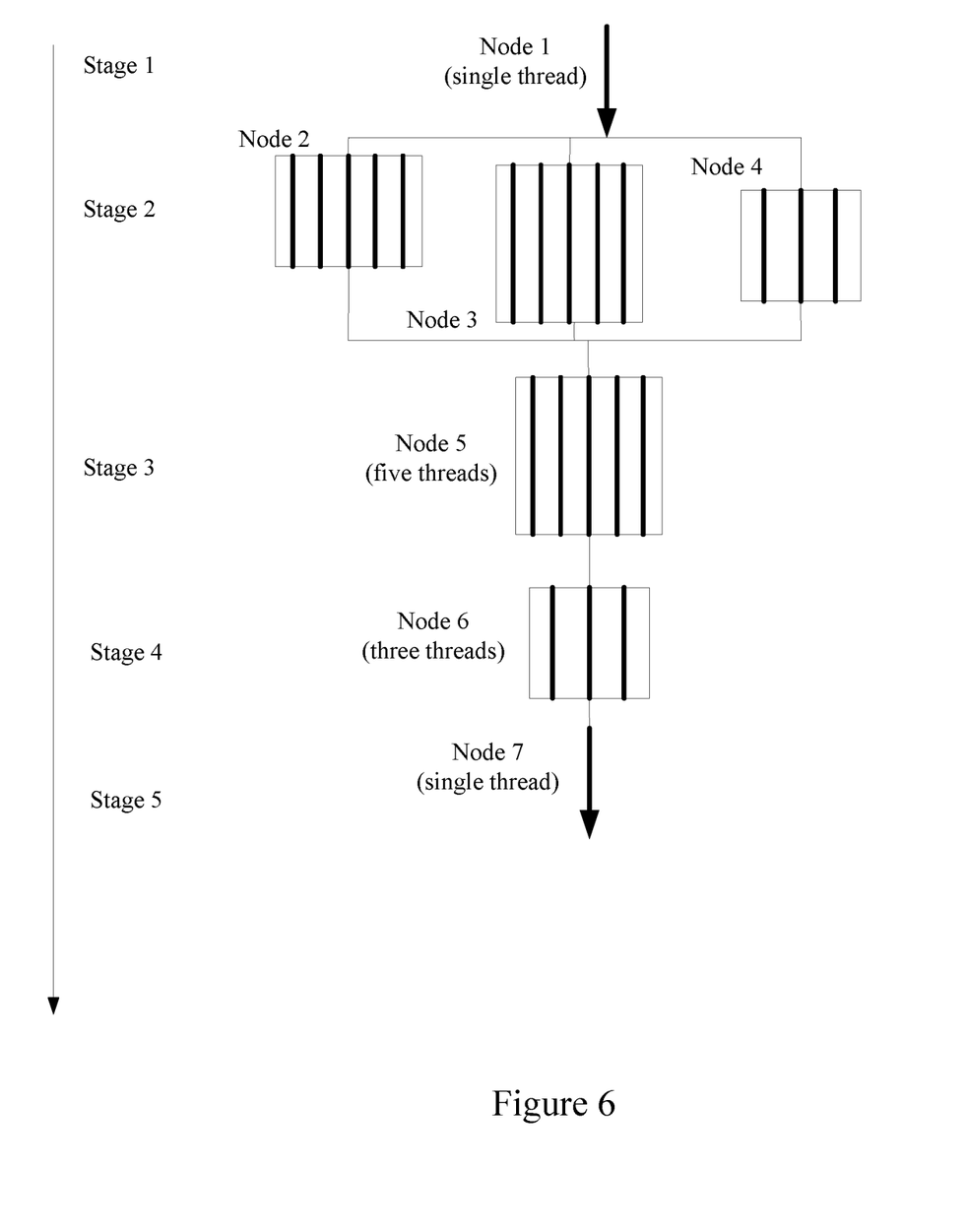
FIG. 6 shows a representation of multiple stages of graph stream processing including multiple threads, according to an embodiment.

FIG. 6 shows a representation of multiple stages of graph stream processing including multiple threads, according to an embodiment. As shown, the multiple stages include, for example, a stage 1, a stage 2, a stage 3, a stage 4, and a stage 5. In an embodiment, one or more stages can be executed simultaneously and at least one thread is completed before execution of the threads of the next (subsequent) stage. As shown, each of the stages includes one or more nodes, wherein each node includes one or more streams. For an embodiment, a stream includes a code-block operating on the one or more processors of the graph streaming processor. Further, as previously described, each stage of the graph streaming processor includes a physical piece of hardware in a scheduler which is responsible for scheduling the threads corresponding to the node/s at a particular depth (as determined by timing of the stage relative to other stages) in the graph. For an embodiment, the stage includes an input command buffer parser, wherein the input command buffer parser generates the threads of the stage based upon commands of a command buffer located between the stage and the previous stage. Further, as described, a node includes one or more code blocks that operate as the stream(s) when executed on the plurality of processors of the graph streaming processor. As shown in FIG. 6, the stage 1 (or depth 0) includes a single node (Node 1) that includes, for example, a single thread operating on the plurality of processors. The stage 2 (or depth 1) includes a plurality of nodes (Node 2, Node 3, Node 4), wherein the Node 2 includes five threads operating on the plurality of processors, the Node 3 includes five threads operating on the plurality of processors, and the Node 4 include three threads operating on the plurality of processors. Note that the threads of Nodes 2, 3, 4 start and end at different times within the stage 2 (depth 1). The stage 3 includes Node 5 that include five threads, stage 4 (or depth 3) includes Node 6 that includes three threads, and stage 5 (or depth 4) includes Node 7 that includes a single thread. In an embodiment, plurality of threads of different stages can executed at the same time.

As described, for an embodiment, a thread includes a set of instructions operating on input data and producing output data. A node can include multiple threads wherein all threads run the same set of instructions but operate on different data. For an embodiment, the threads are executed on a plurality of processors. For at least some embodiments, the uncle/s, cousin/s and sibling/s are always older in the dispatch sequence relative to the child thread.

The command buffers are efficiently managed by the scheduler in each stage includes forwarding of information required by every stage from the input command buffer to the output command buffer and allocating required amount of memory in the output command buffer before scheduling a thread. Further, the scheduler clears the allocated memory with dummy entries, writes the thread-spawn command/s initiated from the thread/s running on the thread processor/s into the output command buffer. The scheduler manages the write, completion and read pointers into the command buffers.

In an embodiment, command buffers 120, 124 and 128 can be implemented as a FIFO in order that the command buffers are small. The output command buffer of a stage is the input command buffer of the next stage. For example, output command buffer of stage 122 is 124. Command buffer 124 is the input command buffer for stage 126. In an embodiment, a command buffer can be small enough to hold the contents until it is read. Once the command buffer is read by the command parser, the contents of the command buffer are no longer required, and hence the command buffer can be overwritten.

Figure 7:
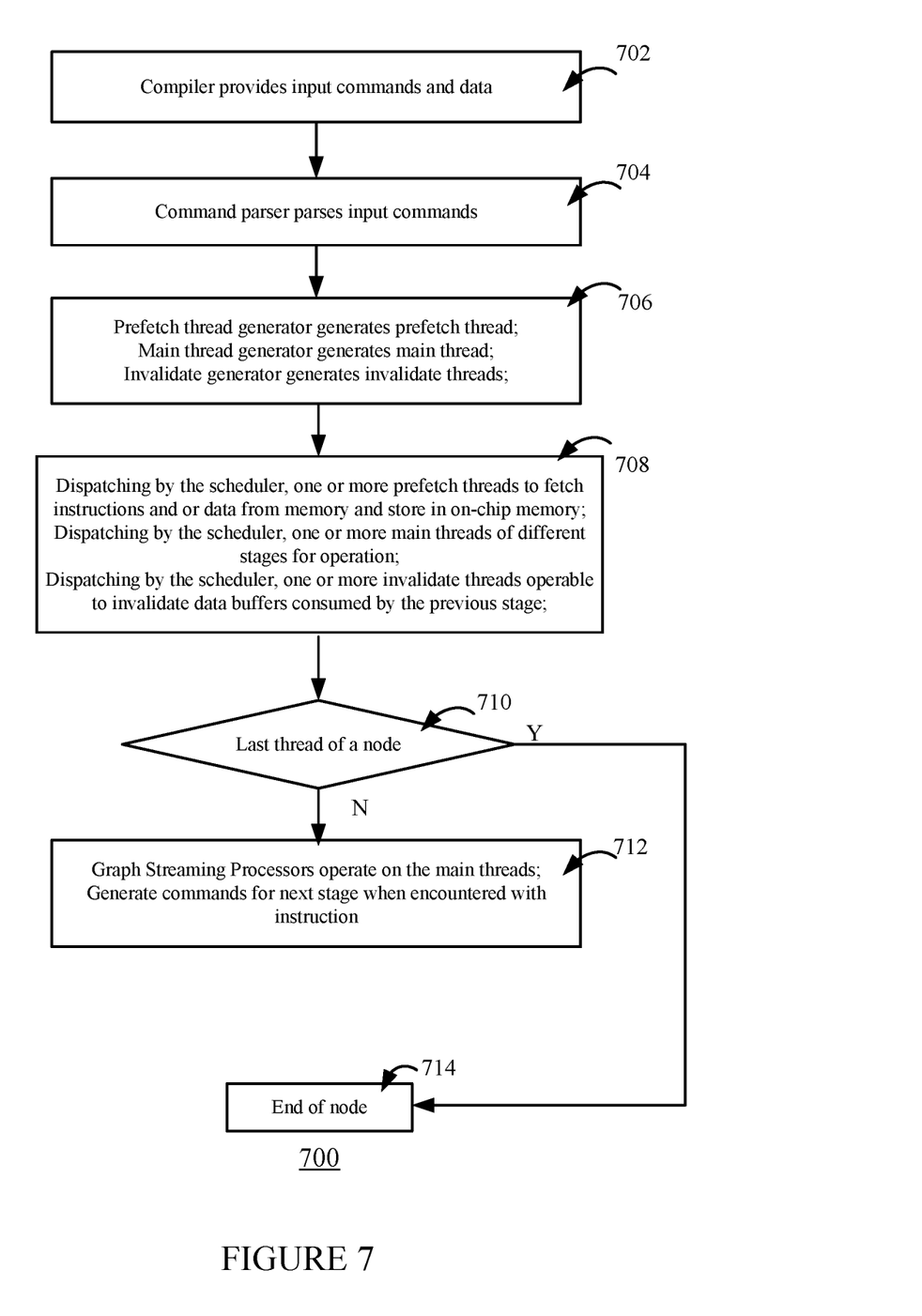
FIG. 7 is a method of steps executed by a scheduler to schedule prefetch threads, main threads and invalidate threads in nodes in an embodiment.

FIG. 7 is a flow chart that includes steps of an example of a method executed by a scheduler for scheduling prefetch threads, main threads and invalidate threads for execution in a GSP system.

In an embodiment, method 700 comprises of the compiler receiving code from main memory 160 and processing the code to generate code blocks, data to the input command buffer 124 of the scheduler 104 and data to data buffer 114 in step 702. In step 704, the command parser of a corresponding stage interprets the commands in the input command buffer. In step 706, plurality of prefetch threads, main threads and invalidate threads of each stage are generated.

In 708, the scheduler 104 schedules the plurality of prefetch threads to fetch data from main memory 160 and store in on-chip memory 108, schedules the plurality of main threads for execution by the graph streaming processor array and schedules the plurality of invalidate threads to invalidate data consumed by the main thread of a previous stage.

In step 710, scheduler checks for last main thread of a node. If the current executed thread is not the last thread, GSP operates on the thread scheduled for operation. During execution if special instructions to generate commands for next stage is encountered the command buffer is updated. Finally, next thread is scheduled for operation. If the current thread is the last thread of a node, then execution of the node is completed.

In step 712, graph streaming processors operate on the plurality of main threads generated in step 706. Step 704 is executed for each stage. Steps 708-714 are executed for each node, and multiple nodes can be executed simultaneously. Similarly, multiple stages can be running simultaneously.

In an embodiment, a graph stream processing system, comprises a plurality of graph streaming processors operative to process a plurality of main threads and a plurality of prefetch threads, wherein each of the plurality of threads include a set of instructions operating on the plurality of graph streaming processors and operating on a set of input data and producing output data, and a scheduler comprising plurality of stages, wherein each of the stages is coupled to an input command buffer and an output command buffer, wherein each stage includes physical hardware implemented using digital logic gates, operative to schedule each of the threads, each stage comprising of a command parser, a main thread generator, a prefetch thread generator, and a thread scheduler, wherein the command parser operative to interpret commands within a corresponding input command buffer, wherein the main thread generator and the prefetch thread generator are coupled to the command parser operate to generate the plurality of main threads and the plurality of prefetch threads respectively, wherein the thread scheduler, coupled to the prefetch thread generator dispatches the plurality of prefetch threads, operative to prefetch instructions from memory into a data buffer; wherein the thread scheduler, coupled to the thread generator dispatches the plurality of threads for operating on the plurality of graph streaming processors, with one or more threads running one or more code blocks on different input data and producing different output data.

In an embodiment, the thread scheduler dispatches at least one of the plurality of prefetch threads before dispatching the main thread of a stage. In some embodiments, the graph streaming processor system further comprises an invalidate thread generator, wherein the invalidate thread generator is coupled to the command parser operative to generate the plurality of invalidate threads.

In some embodiments, the thread scheduler coupled to invalidate thread generator dispatches the plurality of invalidate threads, operative to invalidate a location in the data buffer further where in the thread scheduler dispatches the invalidate thread after execution of the main thread of a stage. In some embodiments, the plurality of graph streaming processors operate simultaneously on a plurality of prefetch threads, plurality of threads and the plurality of invalidate threads of different stages.

In some embodiments, the plurality of graph streaming processors operate simultaneously on the plurality of main threads of a stage and the plurality of prefetch threads of a next stage and the plurality of invalidate threads of a previous stage. In some embodiments, the plurality of graph streaming processors operate simultaneously on the plurality of main threads of a stage and the plurality of prefetch threads of the stage or operate simultaneously on the plurality of main threads of the stage and the plurality of invalidate threads of the stage. In some embodiments, the plurality of graph streaming processors complete operation on at least one main thread of a first stage before the thread scheduler can dispatch main thread from a second stage for operation, wherein operations on the main thread of the second stage start after the operations on the at least one main thread of the first stage.

In some embodiments, the commands to generate main threads for the second stage is computed by the plurality of graph streaming processors operating on the at least one of main threads of the first stage. In some embodiments, the graph streaming processor system further comprising a compiler to generate the one or more code blocks for operating on the plurality of graph streaming processors. In some embodiments, the compiler provides input commands to initiate processing of the graph streaming processor system.

An embodiment of a method of graph stream processing, comprises processing, by a plurality of graph streaming processors, a plurality of main threads, wherein each main thread includes a set of instructions operating on a set of data and producing output data, processing, by a plurality of graph streaming processors, a plurality of prefetch threads, wherein each prefetch thread includes a set of instructions operating to fetch data from memory and store in an on-chip memory, scheduling the plurality of main threads and prefetch threads by a scheduler, wherein the scheduler includes a plurality of stages and a plurality of command buffers located between each of the plurality of stages, wherein each stage includes physical hardware operative to schedule each of the threads, further comprises interpreting by the scheduler, commands within a corresponding input command buffer; dispatching by the scheduler, one or more prefetch threads for operating on the plurality of graph streaming processors, each prefetch thread operating to fetch data from memory and store in the on-chip memory, dispatching by the scheduler, one or more main threads for operating on the plurality of graph streaming processors, with each main thread operating one or more code blocks but on different input data and producing different output data.

In some embodiments, the method further comprises an invalidate thread generator coupled to the command parser operative to generate a plurality of invalidation threads. In some embodiments, dispatching by the thread scheduler, the invalidation thread after execution of the main thread, operable to invalidate the input command buffers of the main thread. In some embodiments, the method further comprises executing the prefetch thread before dispatching the one or more main threads of the same stage and the plurality of graph streaming processors complete operate on at least one main thread of a first stage before the thread scheduler can dispatch invalidate threads of the same stage.

In some embodiments, the method comprises dispatching simultaneously by the scheduler, the plurality of main threads of a stage and the plurality of prefetch threads of the stage or scheduling by the scheduler the plurality of main threads of the stage and the plurality of invalidate threads of the stage or dispatching simultaneously by the scheduler, the plurality of main threads of a stage, the plurality of prefetch threads of a next stage and the plurality of invalidate threads of a previous stage. In some embodiments, the plurality of graph streaming processors complete operation on at least one main thread of a first stage before the thread scheduler can dispatch main threads from a second stage for operation, where in operations on the main threads of the second stage start after the operations on the at least one main thread of the first stage.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter is not limited to particular examples disclosed, but that such claimed subject matter may also include all implementations falling within the scope of the appended claims, and equivalents thereof.

What is claimed:

1. A graph stream processing system, comprising:
a plurality of graph streaming processors operative to process a plurality of main threads and a plurality of prefetch threads, wherein each of the plurality of main threads include a set of instructions operating on the plurality of graph streaming processors and operating on a set of input data and producing output data; and
a scheduler comprising plurality of stages, wherein each stage of the plurality of stages is coupled to an input command buffer and an output command buffer,
each stage comprising:
a command parser operative to interpret commands within a corresponding input command buffer,
a main thread generator and a prefetch thread generator coupled to the command parser and operative to generate the plurality of main threads and the plurality of prefetch threads respectively,
wherein a thread scheduler, coupled to the prefetch thread generator dispatches the plurality of prefetch threads operative to prefetch instructions from memory into a data buffer;
wherein the thread scheduler, coupled to the main thread generator dispatches the plurality of main threads for operating on the plurality of graph streaming processors, with one or more main threads running one or more code blocks on different input data and producing different output data.

2. The system of claim 1, wherein the thread scheduler dispatches the plurality of prefetch threads before dispatching at least one of the plurality of main threads of the each stage.

3. The system of claim 1, further comprising an invalidate thread generator, wherein the invalidate thread generator is coupled to the command parser operative to generate a plurality of invalidate threads.

4. The system of claim 3, further wherein the plurality of invalidate threads operate to invalidate at least a location in the data buffer.

5. The system of claim 3, where in the thread scheduler dispatches the plurality of invalidate threads after execution of the plurality of main threads of the each stage.

6. The system of claim 3, wherein the plurality of graph streaming processors operate simultaneously on the plurality of prefetch threads, the plurality of main threads and the plurality of invalidate threads of different stages.

7. The system of claim 3, wherein the plurality of graph streaming processors operate simultaneously on the plurality of main threads of a stage of the plurality of stages and the plurality of prefetch threads of a next stage of the plurality of stages and the plurality of invalidate threads of a previous stage of the plurality of stages.

8. The system of claim 3, wherein the plurality of graph streaming processors operate simultaneously on the plurality of main threads of a stage of the plurality of stages and the plurality of prefetch threads of the stage or operate simultaneously on the plurality of main threads of the stage and the plurality of invalidate threads of the stage.

9. The system of claim 1, wherein the plurality of graph streaming processors complete execution of at least one main thread of a first stage of the plurality of stages before the thread scheduler can dispatch at least one main thread from a second stage of the plurality of stages for operation on the plurality of graph streaming processors.

10. The system of claim 9, wherein the commands to generate the plurality of main threads for the second stage is computed by the plurality of graph streaming processors operating on the at least one of main threads of the first stage.

11. The system of claim 1, the graph streaming processor system further comprising a compiler to generate the one or more code blocks for operating on the plurality of graph streaming processors.

12. The system of claim 11, the compiler provides input commands to initiate processing of the graph streaming processor system.

13. A method of graph stream processing, comprising:
processing, by a plurality of graph streaming processors, a plurality of main threads, wherein each of the plurality of main threads includes a set of instructions operating on a set of data and producing output data,
processing, by the plurality of graph streaming processors, a plurality of prefetch threads, wherein each of the plurality of prefetch threads includes a set of instructions operating to fetch data from memory and store in an on-chip memory,
scheduling the plurality of main threads and the plurality of prefetch threads by a scheduler,
wherein the scheduler includes a plurality of stages and a plurality of command buffers located between each stage of the plurality of stages,
further comprising:
interpreting by the scheduler, commands within a corresponding input command buffer;
dispatching by the scheduler, one or more of the plurality of the prefetch threads where in each of the plurality of the prefetch threads operating to fetch data from memory and store in the on-chip memory,
dispatching by the scheduler, one or more of the plurality of the main threads for operating on the plurality of graph streaming processors, wherein each of the plurality of main threads operate on one or more code blocks but on different input data and producing different output data.

14. The method of claim 13, further comprising an invalidate thread generator coupled to the command parser operative to generate a plurality of invalidation threads.

15. The method of claim 14, further comprising dispatching by the thread scheduler, the invalidation thread after execution of the plurality of the main threads, operable to invalidate memory locations in the on-chip memory.

16. The method of claim 13, further comprising executing the plurality of prefetch threads before dispatching the one or more main threads of the each stage.

17. The method of claim 14, wherein the plurality of graph streaming processors executes at least one of the plurality of main threads of a first stage before the thread scheduler dispatches the plurality of invalidate threads of the each stage.

18. The method of claim 14, further comprising dispatching simultaneously by the scheduler, the plurality of main threads of the each stage and the plurality of prefetch threads of the each stage or scheduling by the scheduler the plurality of main threads of the stage and the plurality of invalidate threads of the each stage.

19. The method of claim 14, further comprising dispatching simultaneously by the scheduler, the plurality of main threads of the each stage, the plurality of prefetch threads of a next stage of the each stage and the plurality of invalidate threads of a previous stage of the each stage.

20. The method of claim 13, wherein the plurality of graph streaming processors execute at least one of the plurality of main threads of a first stage of the each stage before the thread scheduler dispatches at least one of the plurality of main threads from a second stage of the each stage for execution.

* * * * *